United States Patent [19]

Tsuge et al.

[11] Patent Number: 4,572,543

[45] Date of Patent: Feb. 25, 1986

[54] RETRACTABLE SAFETY BELT SYSTEM

[75] Inventors: Noboru Tsuge, Kariya; Satosi Kuwakado; Masahiro Taguchi, both of Aichi; Toshio Yasui, Anjo, all of Japan

[73] Assignees: Nippon Soken, Inc., Nishio; Nippondenso Co., Ltd., Kariya, both of Japan

[21] Appl. No.: 618,351

[22] Filed: Jun. 7, 1984

[30] Foreign Application Priority Data

Jun. 8, 1983 [JP] Japan ................... 58-102243

[51] Int. Cl.⁴ ............................................ A62B 35/00
[52] U.S. Cl. ................................... 280/807; 297/477
[58] Field of Search ........................... 280/807, 806; 297/475-478

[56] References Cited

U.S. PATENT DOCUMENTS

| | | | |
|---|---|---|---|
| 4,261,531 | 4/1981 | Naitoh | 280/807 |
| 4,320,878 | 3/1982 | Takada | 280/807 |
| 4,382,563 | 5/1983 | Morita et al. | 280/807 |
| 4,456,196 | 6/1984 | Takada et al. | 280/807 |

Primary Examiner—Richard A. Bertsch
Attorney, Agent, or Firm—Cushman, Darby & Cushman

[57] ABSTRACT

A retractable safety belt system for restraining a vehicle occupant in a seat comprising a seat belt secured at one end to a reel of an electric-motor driven retractor. The retractor motor is controlled by control means (9) having a drive circuit (92G) and a reverse rotation or protraction rotation detection circuit (94A) which senses the reverse rotation of the motor as the seat belt is protracted and energizes the motor to retract the seat belt, thereby removing any slack in the seat belt. Preferably, the control means includes an increasing voltage circuit (94C) for gradually increasing the voltage applied to the motor, thereby reducing the motor torque at the initial stage of retraction. Also, the control means preferably includes a load sensing circuit (94B) which de-energizes the motor as the load on the motor and, hence, the tension in the seat belt reaches a predetermined level.

15 Claims, 8 Drawing Figures

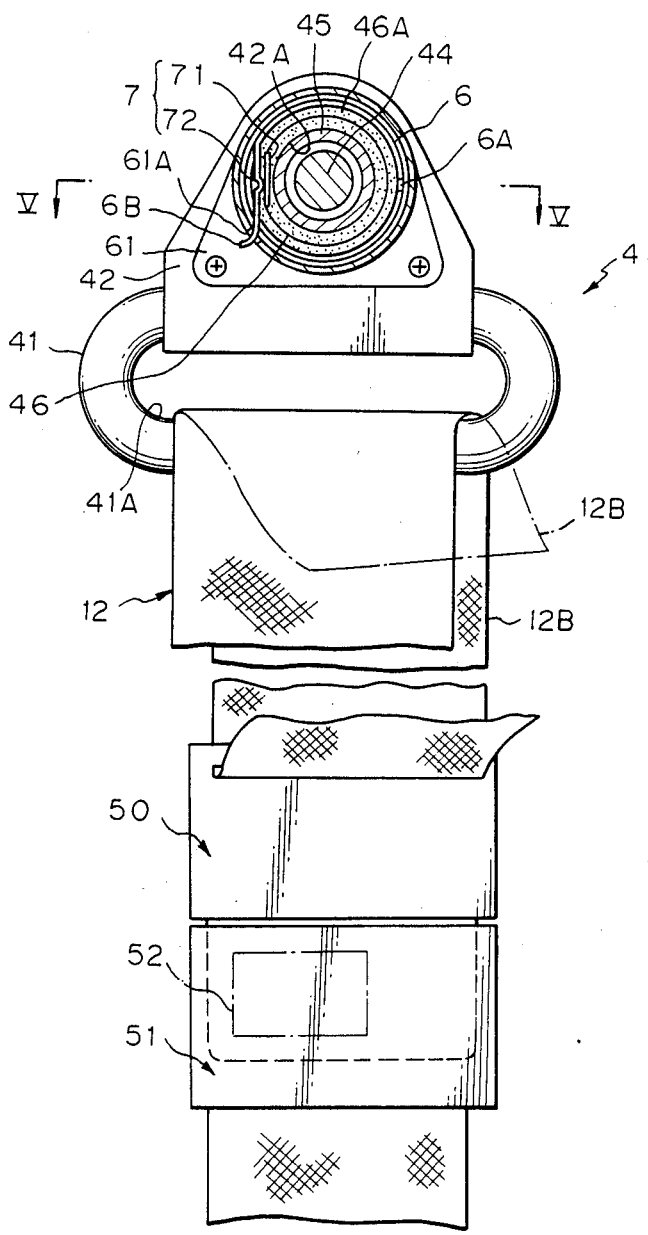

RETRACTABLE SAFETY BELT SYSTEM

BACKGROUND OF THE INVENTION

(1) Field of the Invention

The present invention relates to a retractable safety belt system for use in vehicles such as automobiles for restraining occupants of a vehicle when in the seats of the vehicle.

(2) Description of the Prior Art

Known retractors employed in such a safety belt system generally include a reel mounted for rotation on a retractor body. The reel is biased by a helical spring secured at one end to the reel and at the other end to the retractor body. The helical spring imparts a rotational force to the reel for retraction of a seat belt. Known retractors of this kind suffer from a disadvantaqe in that as the vehicle occupant (hereinafter called the user) manually operates the safety belt system when using the seat belt, the bias force of the helical spring increases as the seat belt is protracted. This renders the handling of safety belt system cumbersome, and discourages the user from using the seat belt. A further disadvantage of the conventional retractor is that the seat belt is under constant tension due to retraction force of the biasing helical spring while the seat belt is worn by the occupant, which also reduces the utilization of the safety belt system.

SUMMARY OF THE INVENTION

The primary object of the present invention is to provide a retractable safety belt system wherein, while the seat belt is being donned by the user, the retracting force that would be exerted on the seat belt is released thereby facilitating and encouraging the use of the seat belt system. Further wherein when the seat belt system is used, the seat belt is held in a relatively relaxed condition and is retracted only when the seat belt is protracted or slackened, thereby exempting the user from a feeling of pressure due to the tension in the seat belt and assuring comfort to the user, and wherein the seat belt is automatically retracted or wound by the reel whenever the user ceases to cause the seat belt to be protracted during the course of donning or doffing the seat belt.

In one aspect of this invention there is provided a seat belt retractor comprising means for retracting the seat belt, means for driving said seat belt retracting means, means for controlling the driving means, and means for detecting the rotation of the driving means in a reverse direction to that of the seat belt retraction direction and for generating a signal indicative of the reverse rotation of the drive means, the control means being operative in response to the signal to operate the drive means to drive the retracting means for retracting the seat belt.

In another aspect of this invention there is provided a retractable safety belt system comprising a seat belt secured at one end to an electrically driven retractor. The retractor includes a body or frame, a reel mounted on the body, and an electrical drive means such as an electric motor coupled with the reel. As in the conventional retractors, the retractor is provided with latch means for preventing the rotation of the reel and with activator means such as a deceleration responsive pendulum for rendering the latch means selectively operative. The electrical drive means is controlled by control means which includes a drive circuit for selectively energizing the drive means. The control means also includes reverse rotation detection means for detecting the unwinding reverse rotation or protraction rotation of the electrical drive means and for generating a signal to the drive circuit to energize the electrical drive means.

This arrangement ensures that the seat belt can be protracted substantially freely as long as the electrical drive means is de-energized. As the seat belt is protracted the reel rotates in the unwinding or protraction direction, causing the then de-energized electrical drive means to rotate in the same direction, whereupon the reverse rotation detection means activates the drive circuit to energize the electrical drive means, thereby rotating the reel in the retraction or winding direction to retract the seat belt.

Preferably, the control means includes means for gradually increasing the voltage applied to the electrical drive means so that the drive means drives the reel with a reduced torque at the initial stage of retraction and the torque is thereafter gradually increased.

It is advantageous to provide the control means with means for detecting the loads on the electrical drive means and for deactivating the drive circuit under a predetermined load condition, so that the retraction is terminated as soon as the tension in the seat belt reaches a predetermined level. Thus, it is possible to prevent the seat belt from being subjected to an excessively high tension, thereby assuring that the seat belt is snug but comfortable when worn by the user.

In a three-point type safety belt system having a slip joint which is mounted generally at a level higher than the seat, it is preferable to swingably mount the slip joint and to incorporate a slack sensing switch connected to the control means. The slack sensing switch is designed so that it is open when the user wears the shoulder belt section of the seat belt causing the slip joint to swing into an inclined angular position, and is closed to energize the electric drive means when slack occurring in the seat belt allows the slip joint to swing back to its generally vertical position. Thus, the electrical drive means is energized to retract the seat belt whenever there is slack in the seat belt.

Where the safety belt system includes a coupling comprising a buckle and a tongue plate, it is preferable to incorporate on the buckle a buckle coupling sensing switch connected to the control means. Whereby, upon engagement of the tongue plate with the buckle, the buckle coupling sensing switch is closed to energize the electrical drive means, thereby retracting the seat belt.

These and other features of the invention as well as the advantages thereof will become apparent from the following description in conjunction with the accompanying drawings.

BRIEF DESCRIPTION OF THE DRAWINGS

FIGS. 4 and 6 are views, partly in cross-section, of the slip joint, in which FIG. 4 illustrates the slip joint in the vertical inoperative position with the slack sensing switch in the closed position, and FIG. 6 illustrates the slip joint in the inclined operative position with the slack sensing switch in the open position; both FIGS. 4 and 6 are taken along the line IV—IV of FIG. 5;

DESCRIPTION OF THE PREFERRED EMBODIMENTS

Figure 1:
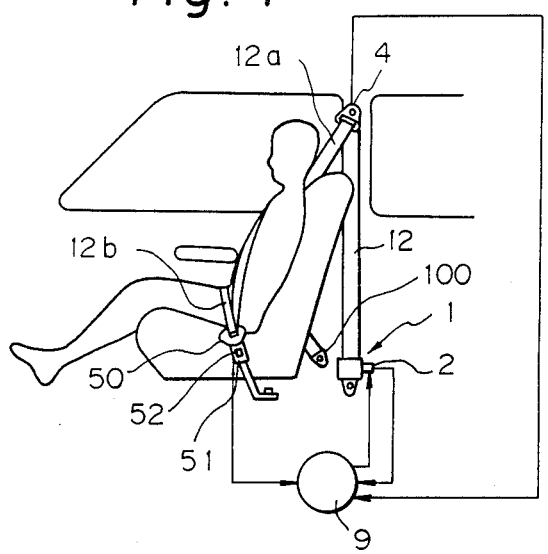
FIG. 1 is an overall view of an embodiment of the safety belt system according to the present invention.

Referring to FIG. 1, the three-point type retractable safety belt system comprises a seat belt 12 secured at one end to an anchor plate 100 and at the other end to a retractor 1. The anchor plate 100 is secured to the vehicle body in the conventional manner. The seat belt 12 is passed through a slip joint 4 and a tongue plate 50 to define a shoulder belt section 12a and a lap belt section 12b. The tongue plate 50 is releasably engaged with a buckle 51 secured to the vehicle floor at a side of the seat opposite the anchor plate 100. By coupling the tongue plate 100 to the buckle 51 the seat belt 12 is ready for restraint of the user. The buckle 51 is provided with a buckle sensor or a buckle coupling sensing switch 52 (shown also in FIG. 4) connected to a control circuit 9. The sensor or switch 52 detectes the coupling of the tongue plate 100 with the buckle 51 and is closed upon engagement therebetween. As described later, the retractor 1 has an electric motor 2 which is controlled by the control circuit 9.

Figure 2:
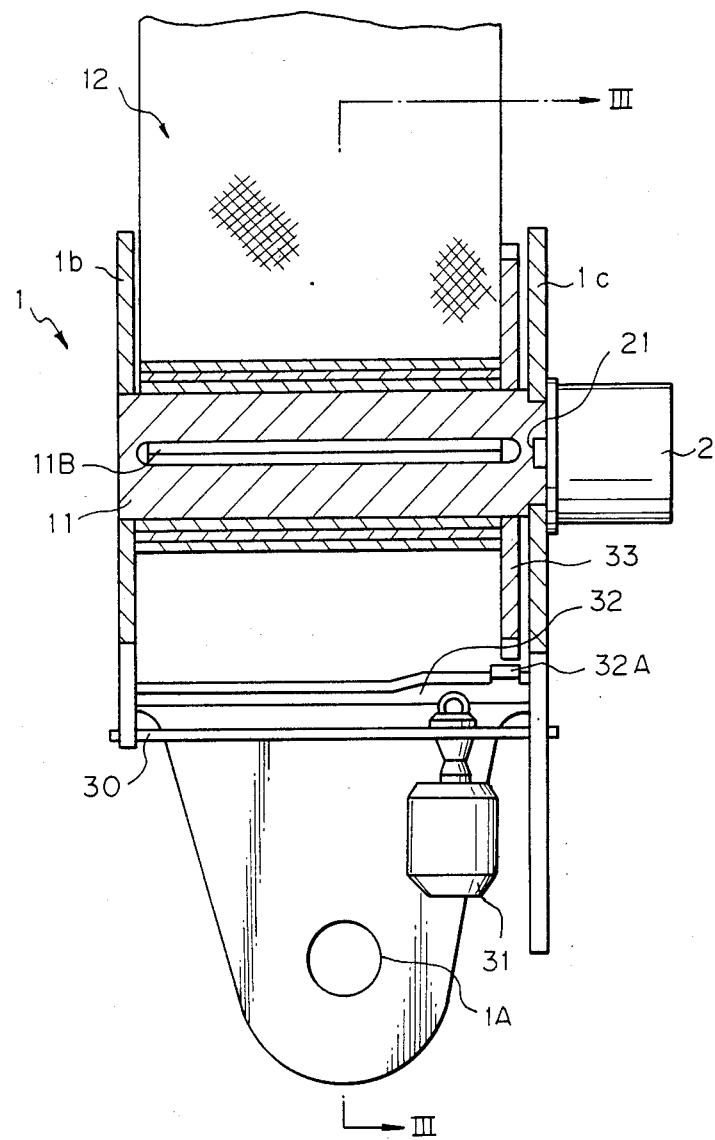
FIG. 2 is a cross-sectional view of the retractor taken along the line II—II of FIG. 3.
Figure 3:
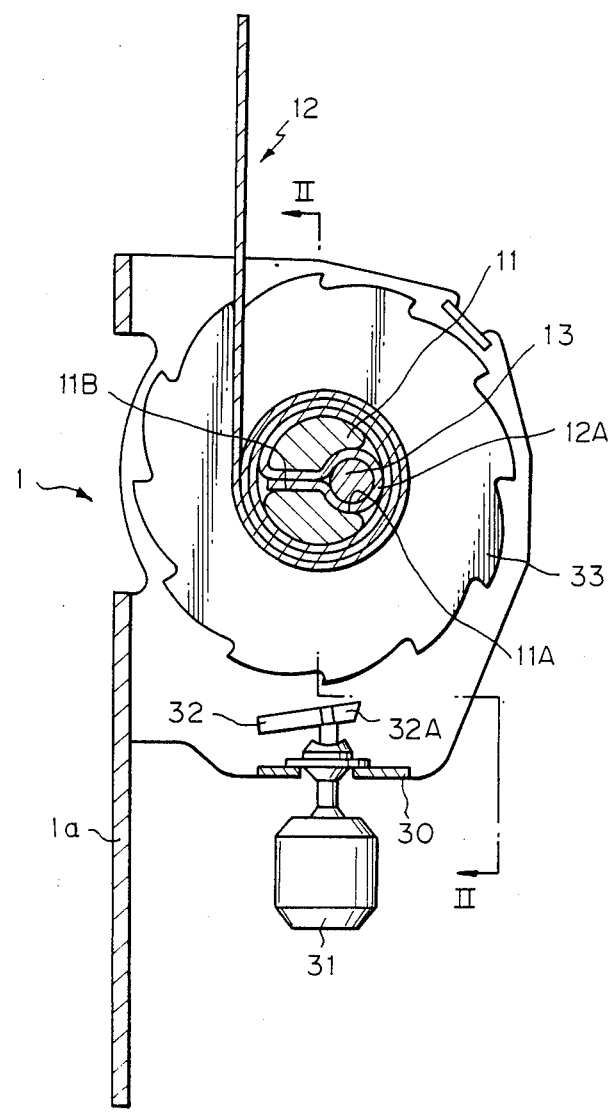
FIG. 3 is a cross-sectional view of the retractor taken along the line III—III of FIG. 2.

Referring to FIGS. 2 and 3, the retractor 1 has a body or frame 1a having a pair of opposite side walls 1b and 1c. The retractor body is fastened to the vehicle body by a screw or bolt (not shown) extending through a hole 1A. A reel 11 is rotatably supported by the side walls 1b and 1c through apertures therein. The reel 11 has an axial recess 11A and an axial slot 11B through which the seat belt 12 extends. The free end of the seat belt 12 is turned over on itself and is stitched thereto to form a loop 12A in which a rod 13 is mounted to hold the loop in position within the recess 11A, to prevent the seat belt 12 from slipping out of the reel 11.

The retractor is provided, mounted to the side wall 1c, with an electric motor 2 serving as a drive means for the reel 11, to wind the seat belt for retraction. In the illustrated examplary embodiment, to the reel 11 for rotation therewith. The motor 2 is connected to and is controlled by the control circuit 9, as described later. The motor 2 is designed to be rotated when energized in the counterclockwise direction, as viewed in FIG. 3. Hereinafter this direction will be referred to as the retraction or winding direction, as opposed to the clockwise protraction or unwinding direction. To the contrary, when the seat belt 12 is being protracted, the output shaft 21 of the motor rotates freely under the traction force exerted on the reel 11, thereby allowing the reel to be rotated in the clockwise direction.

The latch means of the retractor comprises a ratchet wheel 33 secured to the reel 11 and a cooperating pawl 32 pivotably mounted to the side walls 1b and 1c. A conventional deceleration sensing activator means such as a pendulum 31 is mounted swingably on a bracket 30 secured to the retractor body. When the vehicle encounters an emergency situation, such as sudden deceleration or collision, the pendulum 31 swings to urge the tooth 32A of the pawl 32 into latching engagement with the ratchet wheel 33, thereby locking the reel 11 and preventing protraction of the seat belt.

Figure 5:
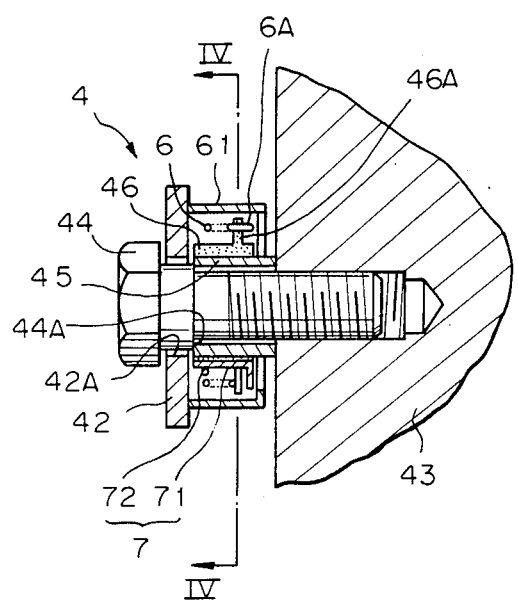
FIG. 5 is a cross-sectional view taken along the line V—V of FIG. 4.
Figure 6:
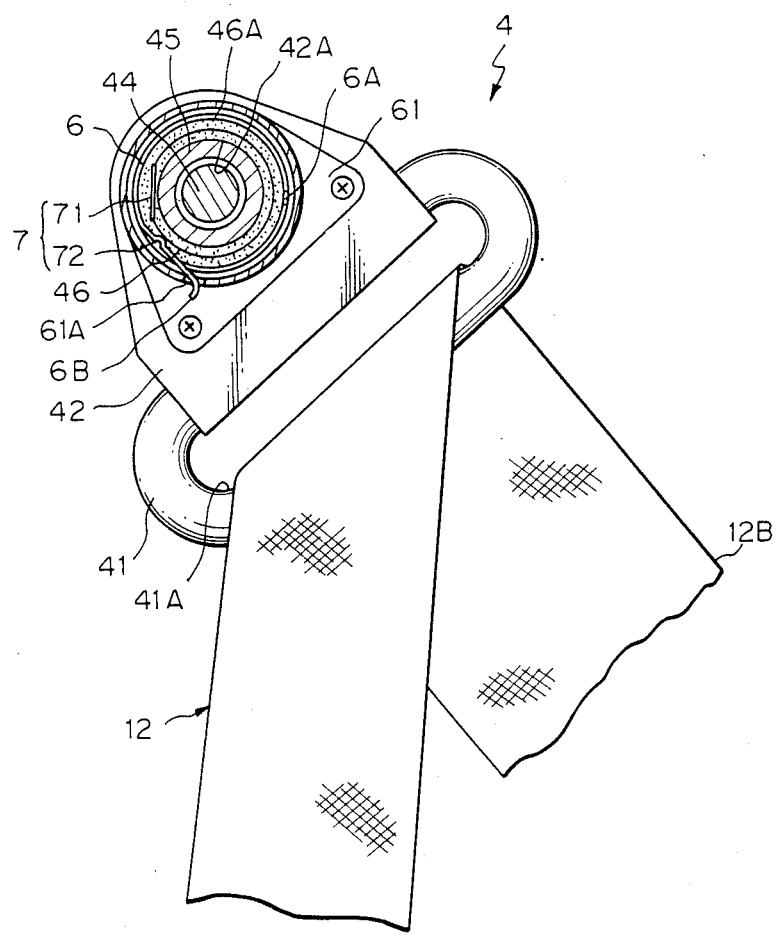

Referring to FIGS. 4 through 6, the slip joint 4, which is mounted to the vehicle body part such as the door pillar and located at a high level, comprises a link 41 having an aperture 41A for allowing the passage therethrough of the seat belt 12 and a base plate 42 supporting the link 41. As best shown in FIG. 5, the base plate 42 has a through aperture 42A which allows the insertion, with a predetermined clearance, of a screw 44 which is secured to the vehicle frame 43 and serves as a pivot for the slip joint 4. Thus, the slip joint 4 is swingable or pivotable about the screw 44. As best shown in FIG. 5, a collar 45 is provided at the screw 44 and is held in position between a shoulder 44A in the shank of the screw 44 and the vehicle frame 43. An insulator collar 46 is mounted around and secured to the collar 45. The insulator collar 46 has an integral flange 46A extending radially outwardly.

A coil spring 6 having an inner diameter larger than the outer diameter of the insulator collar 46 is mounted around and substantially coaxially with the insulator collar 46. The fixed end 6A of the coil spring 6 is secured to the flange 46A of the collar 46, and the movable end 6B thereof is passed through an aperture 61A in a tubular protection cover 61 attached by screws to the base plate 42 of the slip joint 4. The coil spring 6 acts to assist in the backswing movement of the slip joint 4 from the inclined operative position shown in FIG. 6 to the substantially vertical inoperative position shown in FIG. 4 when the seat belt 12 is slackened. In other words, the slip joint 4 moves quickly and smoothly back to the position shown in FIG. 4 under the action of gravity assisted by the action of the coil spring 6 as soon as any slack occurs in the seat belt 12.

The insulator collar 46 is provided at its periphery with an electrically conductive base terminal 71 by any suitable technique such as bonding and plating. The coil spring 6 has at the vicinity of its movable end 6B an integrally formed movable contact terminal 71 opposing to and cooperating with the base terminal 71. The base terminal 71 together with the movable contact terminal 72 constitute a slack sensing switch or slack sensor 7. The slack sensing switch or sensor 7 is closed when the slip joint 4 moves back to the inoperative position shown in FIG. 4, as a result of the release of tension in the seat belt or slack therein, and is opened when tension is applied to the seat belt so that the slip joint 4 is swung into the operative position shown in FIG. 6.

Figure 7:
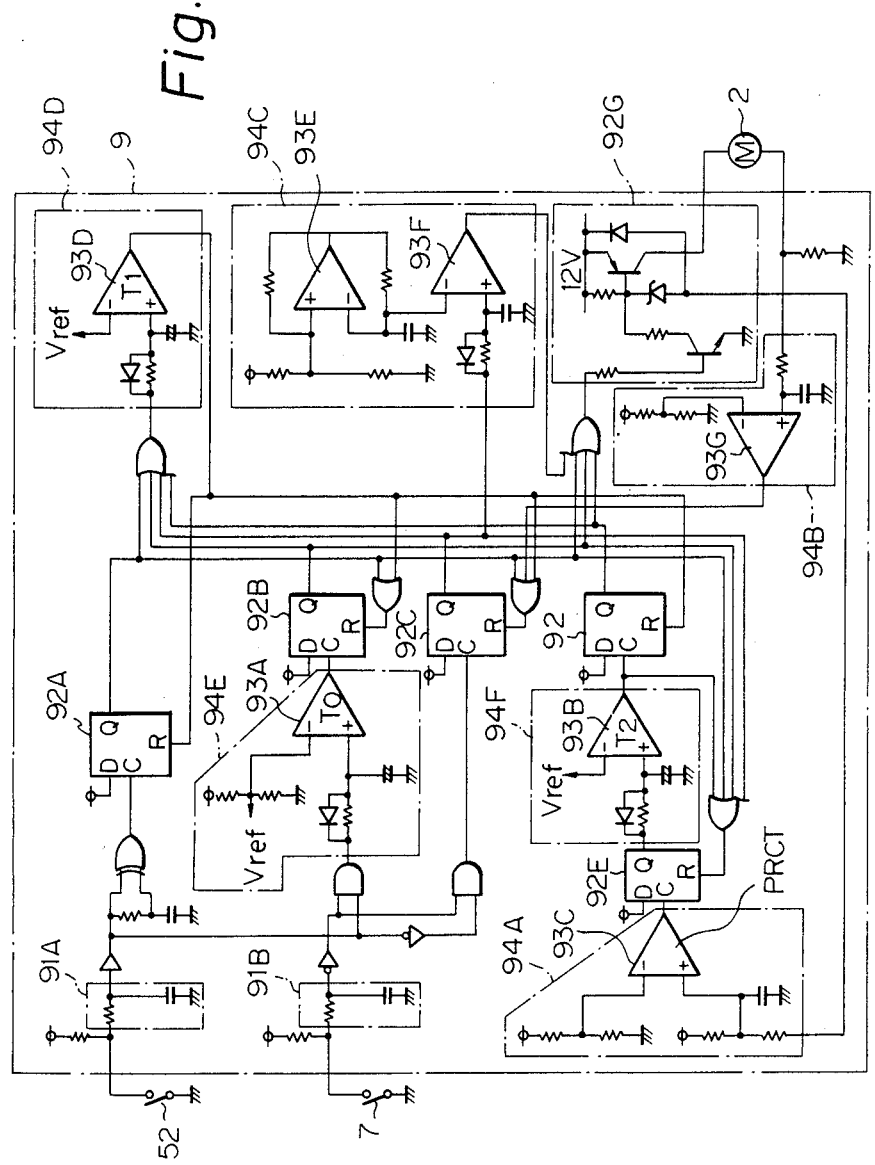
FIG. 7 is a circuit diagram of the control circuit.
Figure 8:
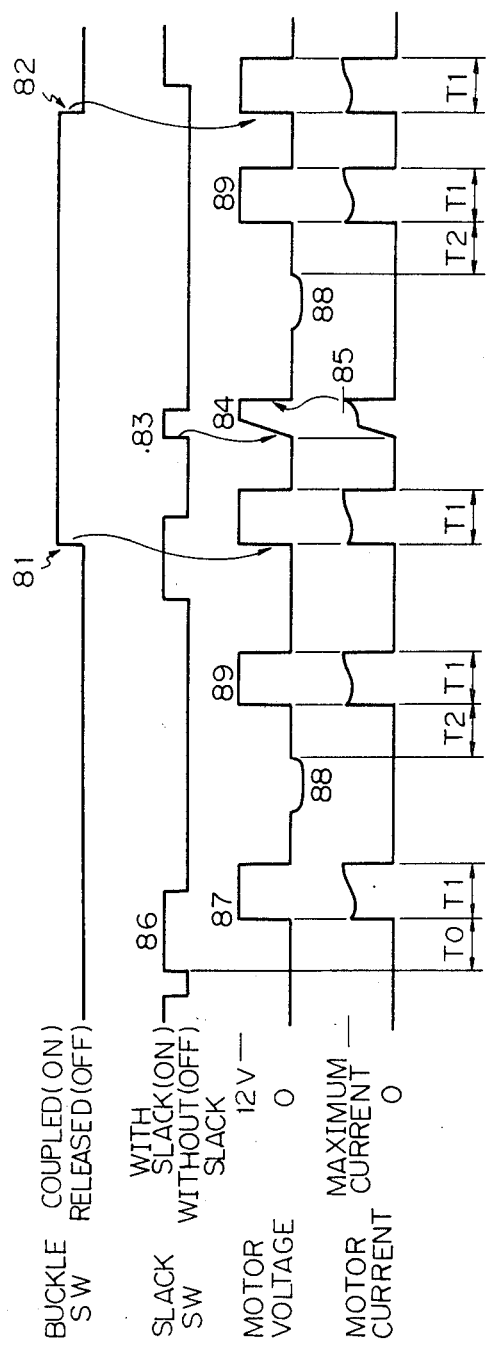
FIG. 8 is a time chart illustrating the operation of the control circuit.

FIG. 7 is a circuit diagram of the control circuit 9 forming the control means for the motor 2, and FIG. 8 is a time chart showing the operational sequence of the control circuit. In FIG. 7, 91A and 91B are filter circuits, 92A, 92B, 92C, 92D, and 92E are D-type flip-flops (e.g., TC4013BP), 93A, 93B, 93C, 93D, 93E, 93F, and 93G are operational amplifiers, 52 is the buckle coupling sensor or switch, 7 is the slack sensor or slack sensing switch, 92G is a drive circuit for the motor, 94A is a reverse rotation detection circuit forming the means for detecting the reverse rotation of the motor, 94B is a load detection circuit forming the means for detecting the loads on the motor 94C is an increasing voltage circuit forming the means for gradually increasing the voltage applied to the motor, in an attempt to gradually increase the motor output torque, 94D is a timer circuit for driving the motor for a predetermined time period, and 94E and 94F are delay circuits for the motor. The filter circuits 91A and 91B become at a "HIGH" level when the contacts of the slack sensor 7 and of the buckle coupling sensor 52 are opened, i.e., OFF. The signal from the buckle coupling sensor 52 is input to the filter circuit 91A, while the signal from the slack sensor 7 is input to the filter circuit 91B. The windings of the motor 2 are connected to the motor drive circuit 92G.

The operation of the illustrated embodiment is as follows.

When the user puts on the seat belt 12 and couples the tongue plate 50 with the buckle 51, the switching signal from the sensor or switch 52 turns from "OFF" to "ON". The timer circuit 94D then issues a signal for a predetermined time $T_1$ through the flip-flop 92A to the motor drive circuit 92G, which, in turn, energizes the motor 2 for a time $T_1$ to drive the reel for retraction, thereby ensuring that the seat belt 12 fits snugly over the user's body without slack. These stages are shown in the time chart of FIG. 8 by the reference numeral 81.

When slack occurs in the seat belt 12 with the tongue plate coupled and with the buckle coupling sensor switch "ON", the slip joint 4 swings to the inoperative positon shown in FIG. 4 causing the slack sensing switch 7 to be closed and to become "ON", as designated at 83 in FIG. 8. The signal from the slack sensing switch 7 is fed to the timer circuit 94D, which, in turn, issues a signal for a predetermined time $T_1$. In response to this signal, the increasing voltage circuit 94C generates, for a predetermined time, a signal of a predetermined frequency such that the duty thereof gradually increases. The signal from the increasing voltage circuit 94C is fed to the drive circuit 92G which energizes the motor 2 with an increasing voltage so that the motor rotates with an increasing torque and speed, thereby gradually retracting the seat belt. The load on the motor is detected by the load detection circuit 94B, which issues a signal and de-energizes the motor when the load reaches a predetermined value. These stages are shown in FIG. 8 at 83, 84, and 85.

When the slack sensing switch 7 becomes "ON" while the tongue plate 50 is disengaged from the buckle 51, the delay circuit 94E operates to delay the energization of the motor 2 for a time $T_0$ and thereafter energizes it for a time $T_1$, as shown at 86 and 87 in FIG. 8.

The slack in the seat belt that can be sensed by the slack sensor is only that present in the free section of the seat belt between the retractor 1 and the slip joint 4 and that present in the shoulder belt section between the slip joint 4 and the tongue plate 50. However, if the seat belt 12 is protracted to create slack in the lap belt section between the tongue plate 50 and the anchor plate 100, the reel 11 is rotated in the reverse, unwinding or protraction direction together with the motor 2, which generates a negative counter electromotive force, which is detected by the reverse rotation detection circuit 94A, which, in turn, energizes the motor 2 through the delay circuit 94F for a time $T_1$ following a delay time $T_2$, as shown in FIG. 8 at 88 and 89. The energization of the motor is performed any time the detection circuit 94A senses the reverse rotation of the motor, regardless of the position of the buckle coupling sensing switch 52 and the slack sensing switch 7. However, the priority between these signals may be set in the following order: signal from the buckle coupling sensor; signal from the slack sensor; and, signal from the reverse rotation detection circuit.

When the user disconnects the tongue plate 50 from the buckle 51, the buckle coupling sensing switch 52 becomes "ON" and the timer 94D issues a signal through the flip-flop 92A for a predetermined time $T_1$, as shown in FIG. 8 at 82. In response to this signal the drive circuit 92G energizes the motor 2 for a time $T_1$ whereby the seat belt 12 is retracted.

The present invention provides various advantages, in that the provision of the delay circuit 94F and 94E ensures that when slack occurs in the seat belt while the user is donning the belt, the motor is driven only after a lapse of predetermined time period so that the seat belt is not under tension during this period. This ensures that the seat belt can be donned with ease and without hindrance. The provision of the increasing voltage circuit 94C enables the seat belt to be gently retracted, thereby avoiding any discomfort. Further, it will be appreciated that during any movement by the user during the retraction by the driving means initiated by the presence of slack in the seat belt, there is an ample degree of freedom allowed for such movement by the user without restraint by the seat belt because the load detection circuit 94B quickly senses the motor load and deactivates the driving means. The load detection circuit operating at a predetermined load condition also assures that the seat belt will not be overly retracted and tightened. Thus, the seat belt may be worn with comfort.

The invention also has an advantage in that slack in the seat belt may foreseen prior to actual occurrence of the slack and without any other specific sensor, because the protraction of the seat belt from the retractor is detected in terms of the counter electromotive force of the motor. This enables a simpler embodiment of the seat belt system according to the invention wherein the slack sensor 7 is omitted and the seat belt retraction is initiated upon detection of the protraction.

As the seat belt is protracted from the retractor, the output shaft 21 of the motor 2, together with the reel 11, rotates freely but with a slight resistance with respect to the stator of the motor, whereby, in actual practice, the seat belt is subjected to a slight tension. Thus, the seat belt will not be excessively protracted.

Still another advantage of the present invention is that the donning and doffing of the seat belt is facilitated since the winding force of the reel is rendered substantially zero duiring such operations. Further, once the seat belt is worn, it is retracted only when the slack in the belt exceeds a predetermined amount. Therefore, the traction force in the seat belt substantially disappears, removing any physical pressure on the user when the seat belt is not being protracted, such as when the user is shifting position in the seat. This imparts a feeling of comfort to the user. If, to the contrary, excessive slack is formed in the seat belt, the seat belt will be quickly retracted to remove such excessive slack, so that the user is securely restrained by the seat belt system.

It will be also appreciated that the seat belt is retracted without delay as soon as the user ceases to don the seat belt.

Although the present invention has been described herein with reference to the specific embodiments thereof, it should be understood that this invention is not limited thereby and various changes and modifications may be made therein. For example, in the illustrated embodiment, the electric motor is energized with a full voltage when the tongue plate is disconnected from the buckle. However, the motor may be fed with a lower voltage at the initial stage of retraction and with a higher voltage after a predetermined time has passed.

Also, in place of a single continuous seat belt, two separate belt straps may be employed to define a lap belt and a shoulder belt, respectively, and both may be secured for simultaneous retraction to the reel of the retractor. Furthermore, the reel may be connected to the motor output shaft by means of an intermediate reduction mechanism, instead of a direct coupling.

While in the illustrated embodiments, the slack in the seat belt is detected by both the slack sensor 7 and the reverse rotation detection circuit 94A, it is also possible to omit the slack sensor 7 and detect the slack merely by the reverse rotation detection circuit 94A.

We claim:

1. A seat-belt retractor comprising: means for retracting the seat-belt; an electric motor for driving said seat-belt retracting means; means for controlling said electric motor; and means responsive to said electric motor for detecting the rotation of said motor in a direction reverse to that of the direction of retraction of the seat-belt and for generating a signal indicative of the reverse rotation of said motor, said control means being operative in response to said signal to operate said motor to drive said retracting means to retract the seat-belt.

2. A seat-belt retractor as defined in claim 1, wherein said control means is operative to control said motor in such a manner that the driving force thereof increases gradually.

3. A seat-belt retractor as defined in claim 1, wherein said control means is operative to deactivate said motor when the loads on said motor reach a predetermined level.

4. A retractable safety belt system for restraining a vehicle occupant in a seat, which comprises:
    a seat belt having first and second ends, said first end being releasably secured to a vehicle body generally at a side of the seat;
    a retractor secured to the vehicle body generally at the other side of the seat and including a body, a reel mounted rotatably on said body and engaged with said second end of the seat belt for protraction and retraction of the seat belt, latch means for preventing rotation of said reel, activator means for rendering said latch means selectively operative, and electrical drive means for rotating said reel in the belt winding direction; and,
    control means including a drive circuit for selectively energizing said electrical drive means;
    said control means including means for detecting the rotation of said electrical drive means in the belt unwinding direction and for generating a signal indicative of said unwinding rotation of said drive means;
    said drive circuit operating in response to said signal to activate said electrical drive means, thereby to rotate said reel in the belt winding direction to retract the seat belt.

5. A safety belt system as defined in claim 4, wherein said means for detecting the unwinding rotation of said electrical drive means and for generating a signal is rendered operative in response to counter electromotive force from said electrical drive means.

6. A safety belt system as defined in claim 4, wherein said control means further comprises means for gradually increasing the voltage applied from said drive circuit to said electrical drive means.

7. A safety belt system as defined in claim 4, wherein said control means further comprises means for detecting the loads exerted on said electrical drive means and for de-energizing said electrical drive means under a predetermined load condition.

8. A safety belt system as defined in claim 4, wherein said first end of the seat belt is releasably secured to said vehicle body by means of a tongue plate releasably engaging with a cooperating buckle, said buckle being provided with buckle sensor means for detecting the engagement of said tongue plate with said buckle, said buckle sensor means being operatively connected to said control means to energize said electrical drive means upon engagement of said tongue plate with said buckle.

9. A three-point type retractable safety belt system for restraining a vehicle occupant in a seat of a vehicle having a vehicle body and a door, which comprises:
    a seat belt having first and second ends, said first end being firmly secured to said vehicle body generally at one side of the seat adjacent said door and generally at the level of said seat;
    a retractor secured to said vehicle body generally at said one side of and at the level of said seat, said retractor including a body, a reel mounted rotatably on said body and engaging with said second end of the seat belt for protraction and retraction, latch means for preventing rotation of said reel, activator means for rendering said latch means selectively operable, and an electric motor means for rotating said reel in the belt winding direction;
    a slip joint mounted swingably to said vehicle body generally at said one side of and at the rear of the seat and at a level substantially higher than the level of the seat;
    a buckle secured to said vehicle body at the other side of the seat;
    a tongue plate releasably engageable with said buckle;
    said seat belt being passed through said slip joint and said tongue plate to define a lap belt section between said first end of the seat belt and said tongue plate and a shoulder belt section between said tongue plate and said slip joint; and,
    control means including a drive circuit for selectively energizing said electric motor means of said retractor;
    said control means including means for detecting the protraction rotation of said electric motor means and for activating said drive circuit under the protraction rotation condition of the electric motor means to energize said electric motor means causing said reel to be rotated in the winding direction to retract the seat belt.

10. A safety belt system as defined in claim 9, wherein said detecting and activating means includes means for activating said drive circuit in response to the counter electromotive force which is generated when said electric motor means is caused to be rotated in the protraction direction.

11. A safety belt system as defined in claim 9, wherein said control means further comprises means for gradually increasing the voltage applied from said drive circuit to said electric motor means to prevent said seat belt from being suddenly retracted.

12. A safety belt system as defined in claim 9, wherein said control means further comprises means for detecting the loads exerted on said electric motor means and for de-activating said drive circuit under a predetermined load condition to prevent said seat belt from being subjected to an excessive tension during the retraction.

13. A safety belt system as defined in claim 9, wherein said swingable slip joint is provided with a slack sensing switch connected to said control means and operable to be selectively closed to activate said control means when slack occurs in said seat belt allowing said slip joint to return to its substantially vertical initial position.

14. A safety belt system as defined in claim 9, wherein said buckle is provided with a buckle coupling sensing switch for sensing the engagement of said tongue plate with said buckle, said buckle coupling sensing switch being connected to said control means and operable to be selectively closed upon engagement of said tongue plate with said buckle to activate said control means to energize said electric motor means causing the reel to be rotated in the winding direction thereby retracting the seat belt.

15. In combination with a retractable safety seat-belt system including a seat belt and a retractor having a belt winding reel driven by an electric motor, control means including a reel unwinding detector circuit for energizing said electric motor, said reel unwinding detector circuit being operative in response to a counter electromotive force generated in said motor when said seat belt is protracted causing the motor to rotate in a direction in reverse to the direction of winding, said control means being operative to energize said motor to rotate in the belt winding direction after a predetermined time delay upon termination of generation of the counter electromotive force.

* * * * *